(12) United States Patent
Brackett et al.

(10) Patent No.: US 11,669,087 B2
(45) Date of Patent: Jun. 6, 2023

(54) CONTROLLING AND MONITORING REMOTE ROBOTIC VEHICLES

(71) Applicant: Howe & Howe Inc., Waterboro, ME (US)

(72) Inventors: Shawn Stevens Brackett, Biddeford, ME (US); Phillip John Pawlukovich, Bel Air, MD (US); Michael J Zagorianakos, Gorham, ME (US); Caroline Ruby Bills, Windham, ME (US)

(73) Assignee: Howe & Howe Inc., Waterboro, ME (US)

( * ) Notice: Subject to any disclaimer, the term of this patent is extended or adjusted under 35 U.S.C. 154(b) by 0 days.

(21) Appl. No.: 17/376,327

(22) Filed: Jul. 15, 2021

(65) Prior Publication Data

US 2023/0016215 A1 Jan. 19, 2023

(51) Int. Cl.
*G05D 1/00* (2006.01)
*H04W 76/10* (2018.01)
(Continued)

(52) U.S. Cl.
CPC ......... *G05D 1/0038* (2013.01); *G05D 1/0022* (2013.01); *G06F 3/0482* (2013.01);
(Continued)

(58) Field of Classification Search
CPC .. G05D 1/0038; G05D 1/0022; G06F 3/0482; G06F 3/0488; G08C 17/02;
(Continued)

(56) References Cited

U.S. PATENT DOCUMENTS 8,030,800 B1 * 10/2011 Terrell ................ H02J 1/001
307/64
9,160,783 B2 10/2015 Pinter
(Continued)

FOREIGN PATENT DOCUMENTS

CN 108686324 10/2018
CN 208783115 4/2019
(Continued)

OTHER PUBLICATIONS

T30 Series All-in-one Portable Ground Control Station, Downloaded Nov. 1, 2022 from https://web.archive.org/web/20200930094257/ https://www.foxtechfpv.com/t30-series-all-in-one-portable-ground-control-station.html#expand, based on web archive dated Sep. 30, 2020.
(Continued)

*Primary Examiner* — Hien L Duong
(74) *Attorney, Agent, or Firm* — BainwoodHuang

(57) ABSTRACT

A method performed by a controller device is provided. The method includes (a) connecting to a plurality of remote robotic vehicles over a wireless connection; (b) selectively controlling one of the plurality of remote robotic vehicles over the wireless connection; and (c) displaying, on a video screen of the controller device, a video stream received from the one remote robotic vehicle over the wireless connection. A corresponding method is provided to be performed by a robotic vehicle. Apparatuses, computer program products, and a system for performing the method(s) are also provided.

20 Claims, 4 Drawing Sheets

(51) Int. Cl.
  *G06F 3/0488* (2022.01)
  *G08C 17/02* (2006.01)
  *G06F 3/0482* (2013.01)
  *H04N 21/2187* (2011.01)
  *H04N 21/431* (2011.01)
  *H04W 84/18* (2009.01)

(52) U.S. Cl.
  CPC .......... *G06F 3/0488* (2013.01); *G08C 17/02* (2013.01); *H04N 21/2187* (2013.01); *H04N 21/4312* (2013.01); *H04W 76/10* (2018.02); *G08C 2201/30* (2013.01); *H04W 84/18* (2013.01)

(58) Field of Classification Search
  CPC .......... G08C 2201/30; H04N 21/2187; H04N 21/4312; H04W 76/10; H04W 84/18
  See application file for complete search history.

(56) References Cited

U.S. PATENT DOCUMENTS

| | | | |
|---|---|---|---|
| 9,185,147 B1* | 11/2015 | Keel | H04L 65/403 |
| 9,274,521 B1 | 3/2016 | Stefani et al. | |
| 9,809,306 B2 | 11/2017 | Stark et al. | |
| 9,842,192 B2 | 12/2017 | Wang et al. | |
| 9,867,331 B1 | 1/2018 | Siudyla et al. | |
| 9,927,807 B1* | 3/2018 | Ganjoo | H04W 76/15 |
| 10,300,888 B1* | 5/2019 | Gilbert-Eyres | H04N 7/185 |
| 10,317,915 B2 | 6/2019 | Tankersley | |
| 10,452,064 B1 | 10/2019 | Ray et al. | |
| 10,567,497 B2 | 2/2020 | Charalambides et al. | |
| 10,631,362 B2 | 4/2020 | Loughran | |
| 11,345,267 B2 | 5/2022 | Howe et al. | |
| 11,513,538 B1* | 11/2022 | Kaneria | G06Q 10/08 |
| 2011/0035079 A1 | 2/2011 | Allen et al. | |
| 2011/0245998 A1 | 10/2011 | Ecton et al. | |
| 2012/0256929 A1* | 10/2012 | Koenig | G09G 5/00 |
| | | | 345/503 |
| 2013/0094538 A1* | 4/2013 | Wang | H04L 63/08 |
| | | | 375/141 |
| 2013/0176230 A1* | 7/2013 | Georgiev | G06F 3/0484 |
| | | | 345/173 |
| 2014/0292509 A1* | 10/2014 | Hildick-Pytte | G06Q 50/06 |
| | | | 340/539.13 |
| 2017/0081160 A1 | 3/2017 | Haug | |
| 2018/0007518 A1 | 1/2018 | O'Berry et al. | |
| 2018/0035306 A1* | 2/2018 | Zavesky | H04B 7/18506 |
| 2018/0139152 A1* | 5/2018 | Shaw | H04W 84/18 |
| 2019/0011908 A1* | 1/2019 | Liu | G06F 3/0482 |
| 2019/0028904 A1* | 1/2019 | Carpenter | G08G 5/0069 |
| 2019/0058852 A1* | 2/2019 | Viswanathan | H04N 21/41407 |
| 2019/0088156 A1* | 3/2019 | Choi | G09B 9/003 |
| 2019/0354099 A1* | 11/2019 | Shomin | A63F 13/25 |
| 2020/0007384 A1* | 1/2020 | Mueck | H04W 12/06 |
| 2020/0103881 A1* | 4/2020 | Halgren, III | G05D 1/0038 |
| 2020/0109954 A1 | 4/2020 | Li et al. | |
| 2020/0154426 A1* | 5/2020 | Takács et al. | G08G 5/0013 |
| 2021/0191389 A1* | 6/2021 | Myles | G06F 3/0489 |
| 2021/0288714 A1* | 9/2021 | Liang | G05D 1/0022 |
| 2021/0385558 A1* | 12/2021 | Walker | H04N 21/8547 |
| 2022/0006962 A1* | 1/2022 | Bathija | H04N 23/60 |
| 2022/0150708 A1* | 5/2022 | White | H04W 12/63 |
| 2022/0210644 A1* | 6/2022 | Maher | H04W 12/069 |

FOREIGN PATENT DOCUMENTS

| | | |
|---|---|---|
| CN | 111251321 | 6/2020 |
| CN | 210691584 | 6/2020 |

OTHER PUBLICATIONS

T20 All-in-one Ground Control Station Mission Planner Windows, Downloaded Nov. 1, 2022 from https://web.archive.org/web/20210516064402/https://unmannedrc.com/products/t20-all-in-one-handheld-fpv-portable-ground-station-8-inch-ips-dual-system-integrated-link-remote-control-system, based on web archive dated May 16, 2021.

Video Feedback Product information; downloaded Nov. 1, 2022 from https://web.archive.org/web/20210512085737/nttps://www.hetronic.com/wp-content/uploads/2020/08/VIDEO-FEEEDBACK.pdf, based on web achive dated May 12, 2021.

Belly Box, downloaded Nov. 1, 2022 from https://web.archive.org/web/20210412182202/https://www.hetronic.com/transmitters/belly-box/, based on web archive dated Apr. 12, 2021.

* cited by examiner

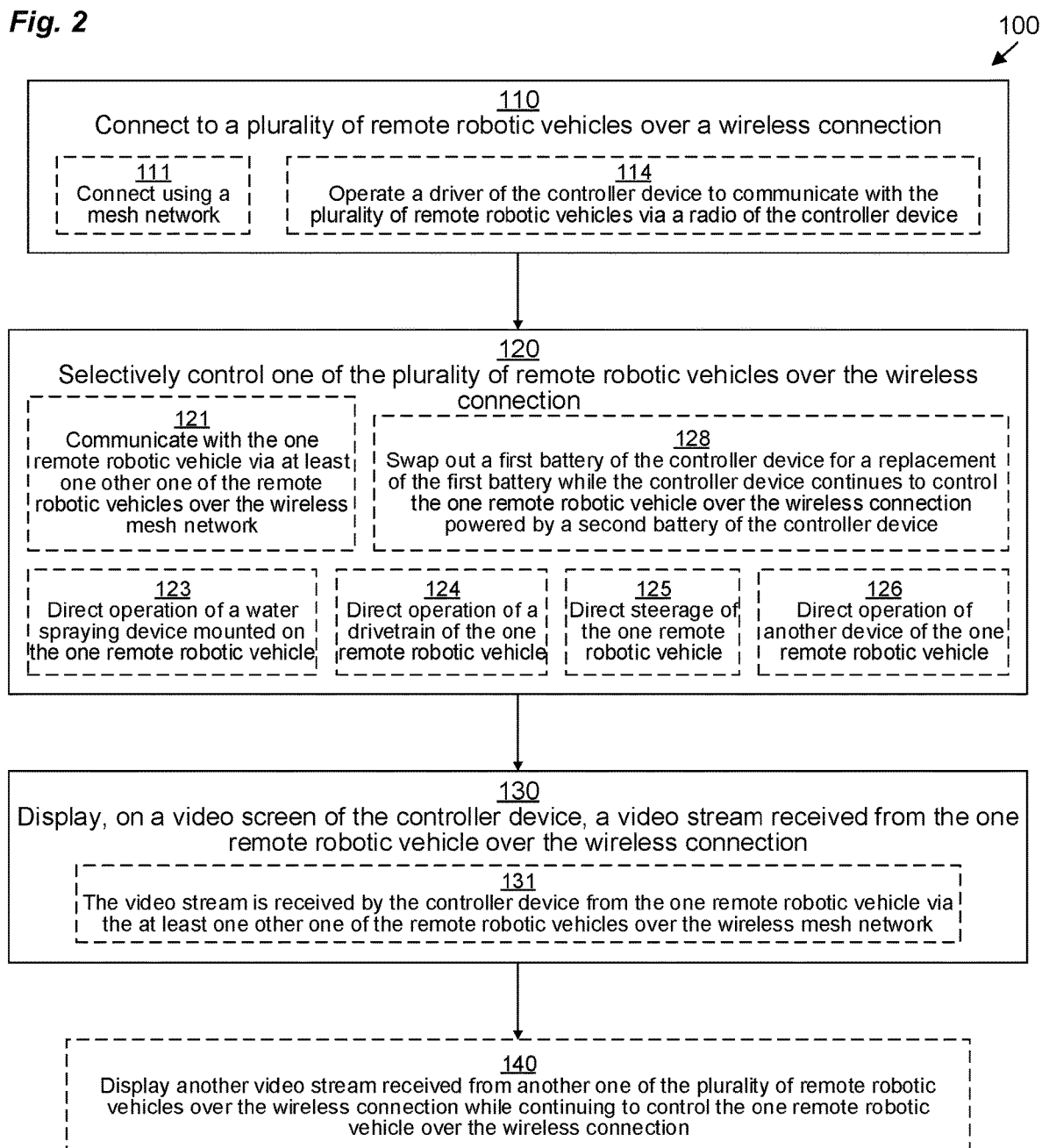

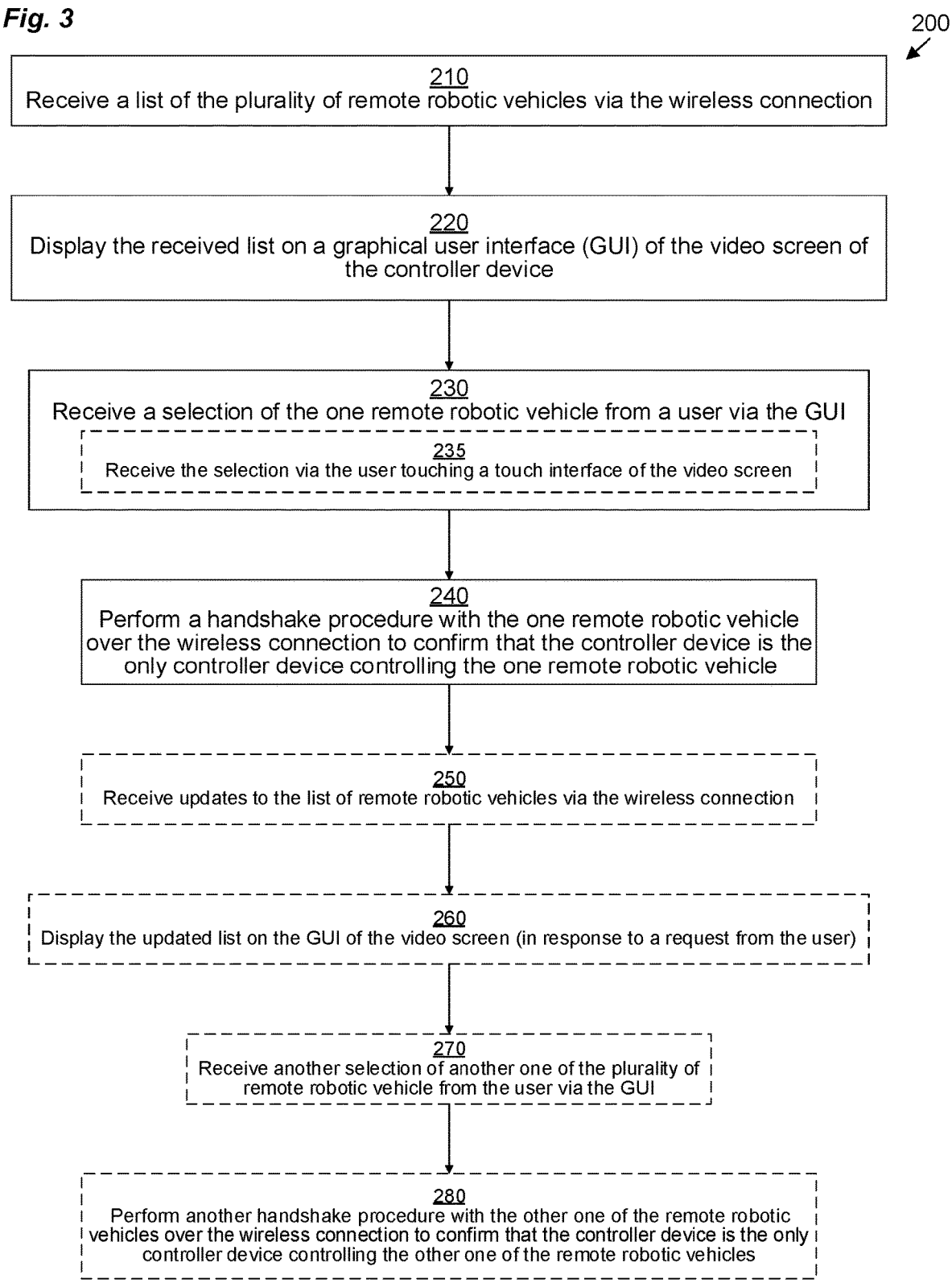

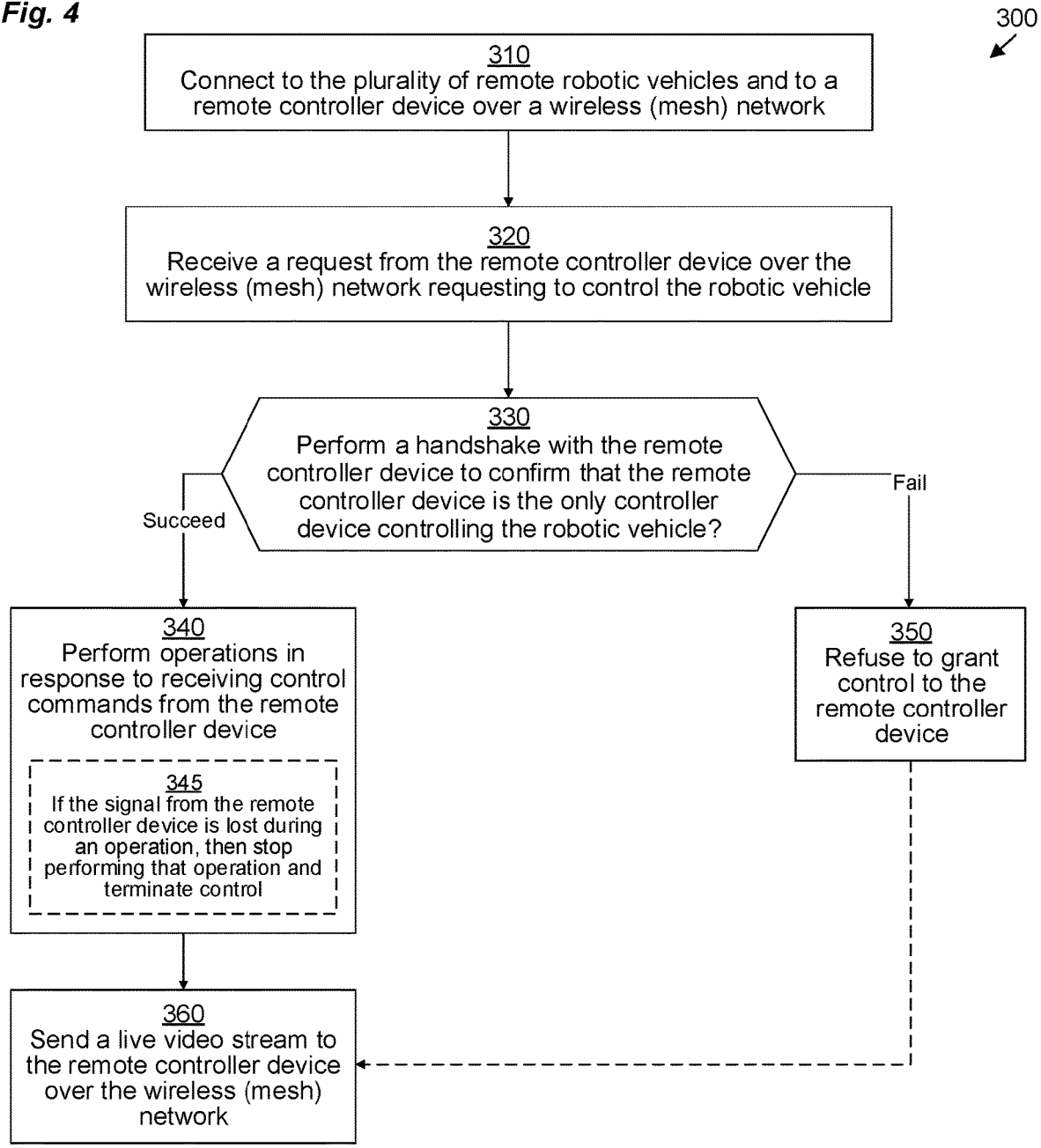

CONTROLLING AND MONITORING REMOTE ROBOTIC VEHICLES

BACKGROUND

1. Field

This disclosure relates generally to controlling and monitoring remote robotic vehicles, and more particularly to techniques for selectively controlling a remote robotic vehicle and displaying a video feed therefrom at a controller device.

2. Description of Related Art

Robotic vehicles have many uses, including performing tasks in areas too dangerous for humans to enter. For example, a firefighting robot called "Thermite" is available from Howe & Howe Inc. of Waterboro, ME. A human operator is able to remotely control a robotic vehicle using a controller device which is hard-wired to control that particular robotic vehicle over a dedicated communications channel. In some systems, the robotic vehicle is also able to stream a video feed to the controller device over a separate communications channel.

SUMMARY

Robotic vehicles can present a challenge to monitor and control effectively. Although remote controllers exist, a typical controller device is able to only connect to and control a single remote robotic vehicle. In some instances the controller device is hard-wired to connect to and control that remote robotic vehicle over a control channel, while in other instances, dedicated circuitry for connecting to and controlling that remote robotic vehicle over the control channel may be installed on a removable card or circuit board to allow a different remote robotic vehicle to be controlled after swapping for a different card or circuit board. This, it is either impossible or difficult for a single controller device to control different remote robotic vehicles.

In addition, the control channel is very low bandwidth. If video is to be provided by the robotic vehicle to the remote controller device, it must be done across a separate higher-bandwidth channel, introducing complexity by requiring multiple radios. In addition, the controller device is not very flexible. Thus, it may be difficult or impossible to change control features, and it is generally not possible to hot-swap a charged battery into the controller during operation.

An improved controller device addresses these issues, in whole or in part, by simultaneously communicating with several remote robotic vehicles over a wireless network and allowing a user to select a particular one of those remote robotic vehicles to be controlled by the controller device. A high bandwidth channel is used, allowing control and video to be sent over the same channel. Flexible software is installed on the controller device allowing control features to be easily upgraded and configured through software. In addition, the controller device may be constructed and arranged as a small tablet or similar computer embedded into a chassis having a radio and two battery slots, allowing one battery to be removed while another battery is swapped out during operation to provide high availability. The video may be displayed on the improved controller device overlaid with graphical control elements.

In one embodiment, a method performed by a controller device is provided. The method includes (a) connecting to a plurality of remote robotic vehicles over a wireless connection; (b) selectively controlling one of the plurality of remote robotic vehicles over the wireless connection; and (c) displaying, on a video screen of the controller device, a video stream received from the one remote robotic vehicle over the wireless connection.

A controller device for performing the method is also provided. The controller device includes (1) a radio configured to connecting to a plurality of remote robotic vehicles over a wireless connection; (2) a video screen; and (3) processing circuitry coupled to memory configured to: (i) selectively control one of the plurality of remote robotic vehicles over the wireless connection; and (ii) display, on the video screen, a video stream received from the one remote robotic vehicle over the wireless connection.

In addition, a method performed by a robotic vehicle of a plurality of robotic vehicles is also provided. The method includes (A) connecting to the plurality of remote robotic vehicles and to a remote controller device over a wireless mesh network; (B) receiving a request from the remote controller device over the wireless mesh network requesting to control the robotic vehicle; (C) in response to receiving the request, performing a handshake with the remote controller device to confirm that the remote controller device is the only controller device controlling the one remote robotic vehicle; (D) performing operations in response to receiving control commands from the remote controller device; and (E) sending a live video stream to the remote controller device over the wireless mesh network. An apparatus for performing this method is also provided.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. The drawings are not necessarily to scale, emphasis instead being placed upon illustrating the principles of various embodiments.

FIG. 2 is a flowchart depicting an example procedure according to various embodiments.

FIG. 3 is a flowchart depicting an example procedure according to various embodiments.

FIG. 4 is a flowchart depicting an example procedure according to various embodiments.

DETAILED DESCRIPTION OF THE INVENTION

Figure 1:
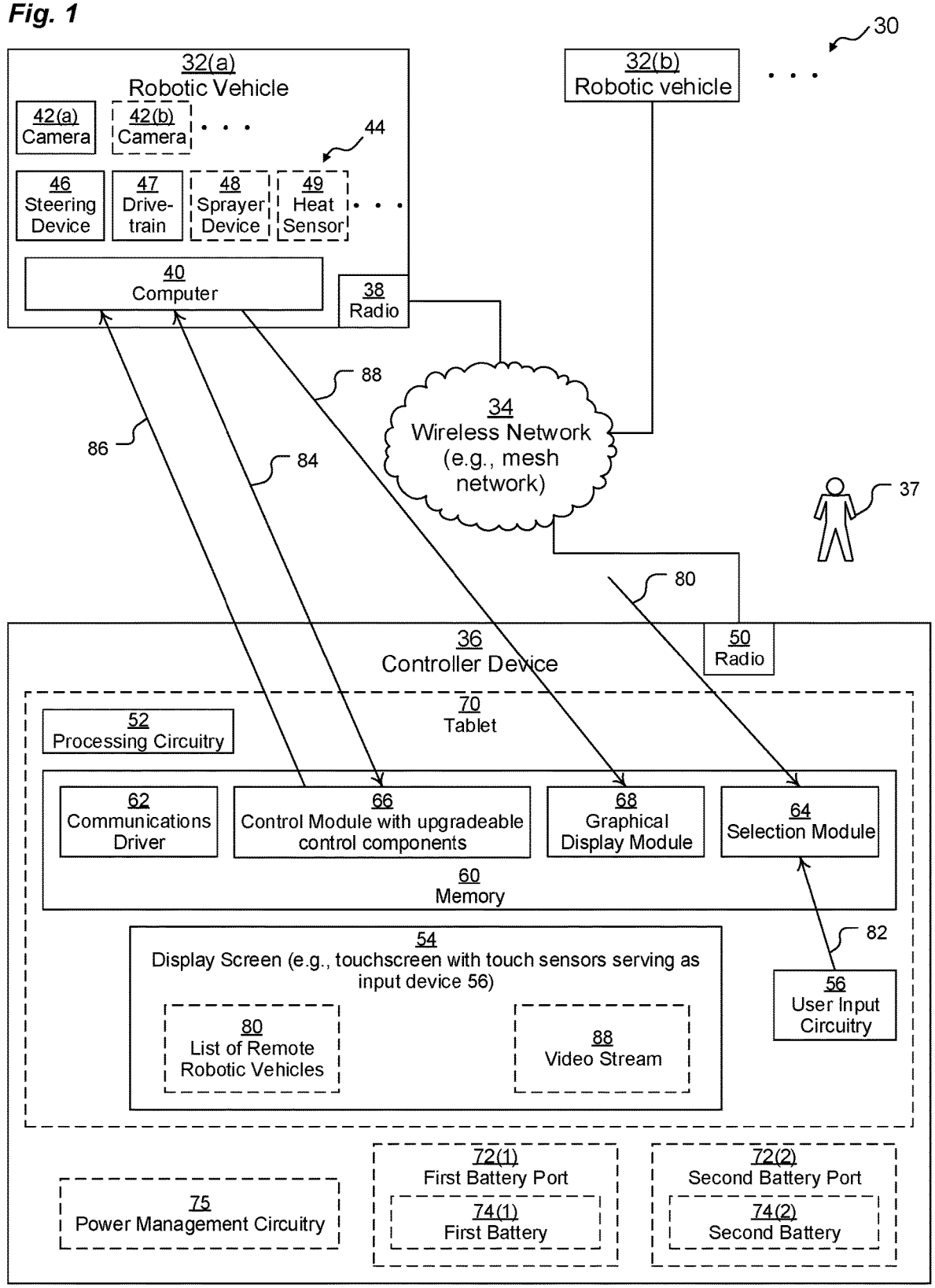
FIG. 1 is a block diagram of an example system and apparatuses for use in accordance with various embodiments.

Embodiments are directed to techniques for effectively monitoring and controlling robotic vehicles. These techniques include simultaneously communicating with several remote robotic vehicles over a wireless network and allowing a user to select a particular one of those remote robotic vehicles to be controlled by the controller device. A high bandwidth channel is used, allowing control and video to be sent over the same channel Flexible software is installed on the controller device allowing control features to be easily upgraded and configured through software. In addition, the controller device may be constructed and arranged as a small tablet or similar computer embedded into a chassis having a radio and two battery slots, allowing one battery to be removed while another battery is swapped out during operation to provide high availability.

FIG. 1 depicts an example system 30 for use in connection with various embodiments. System 30 includes a set of at least two robotic vehicles 32 (depicted as robotic vehicles 32(a), 32(b), . . . ) connected via a wireless network 34 to at least one controller device 36.

Robotic vehicles 32 may be any kind of robotic vehicles, including robotic ground vehicles, robotic aerial vehicles, and robotic water vehicles. An example robotic ground vehicle is a firefighting robot, such as the Thermite firefighting robot available from Howe & Howe Inc. of Waterboro, ME.

Wireless network 34 may be any kind of wireless connection between robotic vehicles 34 and controller device, such as, for example, a shared radio channel, a set of point-to-point radio channels between each robotic vehicle 32 and the controller device 36, or a packet-based wireless network (e.g., Wireless Fidelity or Wi-Fi). In an example embodiment, wireless network 34 is a wireless mesh network. In this example, each device 32, 36 attempts to establish a direct point-to-point connection to every other device 32, 36 that it is able to reach directly. In addition, any device 32, 36 is able to communicate indirectly with any other device 32, 36 that is reachable from another device 32, 36 that is reachable. For example, if controller device 36 is able to communicate directly with robotic vehicle 32(b) but not robotic vehicle 32(a), and robotic vehicle 32(b) is able to communicate directly with robotic vehicle 32(a), then controller device 36 is able to communicate with robotic vehicle 32(a) indirectly via robotic vehicle 32(b).

Controller device 36 is a handheld device operated by a user 37 to remotely control a robotic vehicle 32 and/or to watch video streamed from one or more of the robotic vehicles 32.

Each robotic vehicle 32 includes a radio 38, a computer 40, one or more cameras 42 (depicted as cameras 42(a), 42(b), . . . ), and a set of devices 44. Devices 44 at least include a steering device 46 and a drivetrain 47, which, in some embodiments, may be merged.

If robotic vehicle 32 is a ground vehicle, then drivetrain 47 may include one or more engines connected to one or more wheels via one or more transmissions. The engine(s) may include one or more of an electric, combustion, hydraulic, or other type of engine. Drivetrain 47 may also include one or more braking mechanisms. In some embodiments, wheels of the robotic vehicle 32 may be mounted on one or more tracks, such as a metal or rubber belt with a grooved exterior surface to provide improved traction. In some embodiments, steering device 46 may include a mechanism for rotating an axle (with one or more wheels mounted thereon) with respect to another axle (with one or more wheels mounted thereon). In other embodiments, steering device 46 may be merged with drivetrain 47. In such embodiments, the robotic vehicle 32 may be steered by sending more operating power to one or more wheels (e.g., wheels mounted on a first track) than to one or more other wheels (e.g., wheels mounted on a second track).

If robotic vehicle 32 is an aerial vehicle or a water vehicle, then drivetrain 47 may include one or more propellers or jet engines, while steering device 46 may include one or more rudders, elevators, ailerons, or other similar devices. In other embodiments, steering device 46 may be merged with drivetrain 47. In such embodiments, the robotic vehicle 32 may be steered by sending more operating power to one or more propellers or jet engines than to one or more other propellers or jet engines.

A robotic vehicle 32 may also include various other devices and modular attachments 44, such as, for example, a sprayer device 48 used to spray water out of the robotic vehicle 32, a heat sensor 49, and various other mechanisms and sensors (not depicted). An example additional sensor might include a gas detector.

A robotic vehicle 32 typically includes at least one camera 42(a). In some embodiments, a robotic vehicle 32 may include several cameras 42, each mounted at a different position with a different viewpoint. In some embodiments, one or more of the cameras 42 may controllable to rotate, translate, and/or zoom.

Computer 40 may be any kind of computing device installed on the robotic vehicle 32, such as, for example, a single-board computer, a personal computer, workstation, server computer, enterprise server, laptop computer, tablet computer, smart phone, mobile computer, etc. Computer 40 includes processing circuitry, memory, and communications circuitry (not depicted). Computer 40 is configured to receive data from cameras 42 and devices 44 and to send relevant data to a remote controller device 36 over wireless network 34 via radio 38. Radio 38 may be any kind of radio configured to send signals across wireless network 34. In one embodiment, radio 38 operates in the gigahertz range and is able to send at least 60 megabits per second of data across network 34.

Controller device 36 includes a radio 50, processing circuitry 52, a display screen 54, user input circuitry 56, and memory 60. In some embodiments, processing circuitry 52, display screen 54, user input circuitry 56, and memory 60 are all housed within a tablet computer 70 that is embedded within controller device 36 together with radio 50 and one or more battery ports 72 configured to receive batteries 74. In some embodiments, controller device 36 may also include power management circuitry 75 and additional user input circuitry (not depicted) outside of the tablet 70. This additional user input circuitry may include, for example, one or more buttons, keys, knobs, switches, joysticks, pointing devices, touchpads, trackballs, pointing sticks, etc.

Radio 50 may be any kind of radio configured to send signals across wireless network 34, similar to radio 38.

Processing circuitry 52 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Display screen 54 may be any kind of electronic display device, such as, for example, a liquid crystal display (LCD) or light emitting diode (LED) based screen made up of an array of pixels. In some embodiments, display screen 54 may have at least a high definition resolution of 1280×720 or 1920×1080 or higher. In some embodiments, display screen 54 has a refresh rate of at least 30 frames per second.

User input circuitry 56 may include, for example, one or more buttons, keys, knobs, switches, joysticks, pointing devices, touchpads, trackballs, pointing sticks, etc. In some embodiments, user input circuitry 56 may include touch receptors or a touch interface embedded on or within display screen 54, display screen 54 and user input circuitry 56 combining to form a touchscreen.

First battery port 72(1) is configured to accept a first battery 74(1), and second battery port 72(2) is configured to accept a second battery 74(2). When a charged battery 74(1) is inserted in the first battery port 72(1), power management circuitry 75 is configured to route power from first battery port 72(1) to tablet 70 and radio 50 (and the user input circuitry). When a charged battery 74(2) is inserted in the second battery port 72(2), power management circuitry 75 is configured to route power from second battery port 72(2) to tablet 70 and radio 50 (and the user input circuitry). If charged batteries 74(1), 74(2) are inserted in both battery ports 72(1), 72(2), then power management circuitry 75 is configured to route power from either or both battery ports 72(1), 72(2) to tablet 70 and radio 50 (and the user input circuitry), depending on the embodiment. In some embodiments, tablet 70 may contain its own internal battery or power source (not depicted), which is charged from battery ports 72(1), 72(2). Thus, either battery 74(1), 74(2) may be removed during operation (e.g., to hot swap for a replacement) while the controller device 36 continues to operate normally.

Memory 60 may be any kind of digital system memory, such as, for example, random access memory (RAM). Memory 60 stores an operating system (not depicted), executing software, and related data as part of its contents. Memory 60 stores a communications driver 62, a control module 66, a graphical display module, and a selection module 64. Communications driver 62 interfaces with radio 50, allowing the other modules 64, 66, 68 to communicate across network 34.

Selection module 64 is configured to receive a list 80 of robotic vehicles 32 available via the network 34 and to send the list 80 to graphical display module 68 for display on display screen 54. Selection module 64 is also configured to receive a selection 82 of a particular robotic vehicle 32 to control from user 37 via user input circuitry 56 (e.g., by user 37 touching the display screen 54 over a name or identifier of that robotic vehicle 32). Selection module 64 is then configured to send that selection 82 to control module 66.

Control module 66 is configured to perform a handshake operation 84 over network 34 with the computer 40 of particular robotic device 32(*a*) indicated by selection 82. Handshake operation 84 is configured to confirm whether or not the selected robotic vehicle 32(*a*) is available to be controlled (e.g., only if no other controller device 36 is already controlling it), and upon such confirmation, setting up a control relationship. The, control module 66 receives commands from user 37 via user input circuitry 56 and sends corresponding commands 86 across network 34 to control that particular robotic vehicle 32(*a*) via its devices 44, such as steering device 46, drivetrain 47, and other mechanisms such as sprayer device 48. Computer 40 receives the commands 86 and transmits them to the appropriate devices 44. Commands 86 may also include requests for sensor data from sensory devices such as heat sensor 49.

Control module 66 is configured to include submodules (not depicted), each dedicated to controlling a specific device 44. These submodules are software-upgradeable so that as the specifications of the various devices 44 change, the respective submodules can be updated and/or replaced. Similarly, submodules may be added or removed.

Once a robotic vehicle 32(*a*) is assigned to be controlled by a controller device 36, that robotic vehicle 32(*a*) typically begins sending a video stream 88 from one of its cameras 42 across wireless network 34 toward the controller device 36. Graphical display module 68 receives the video stream 88 and displays it on the display screen 54. In some embodiments, the video stream 88 may be a high definition video stream, such as a 720p60 or 1080p30 video stream.

In some embodiments, the user 37 of the controller device 36 may issue a command to switch which camera 42 streams the video 88. In some embodiments, the video stream 88 from a robotic vehicle 32(*a*) may be viewed at controller devices 36 aside from the one which is controlling the robotic vehicle 32(*a*) that is generating it. In some embodiments, the video stream 88 may be broadcast or multicast. In some embodiments, the robotic vehicle 32(*a*) may stream multiple video streams 88 simultaneously (e.g., one stream 88 per camera 42).

Memory 60 may also store various other data structures used by the operating system, driver 62, modules 64, 66, 68, and various other applications and drivers. In some embodiments, memory 60 may also include a persistent storage portion. Persistent storage portion of memory 60 may be made up of one or more persistent storage devices, such as, for example, flash drives, solid-state storage drives, or other types of storage drives. Persistent storage portion of memory 60 is configured to store programs and data even while the tablet 70 or controller device 36 is powered off. The operating system, driver 62, modules 64, 66, 68, and various other applications and drivers are typically stored in this persistent storage portion of memory 60 so that they may be loaded into a system portion of memory 60 upon a system restart or as needed. The operating system, driver 62, modules 64, 66, 68, and various other applications and drivers, when stored in non-transitory form either in the volatile portion of memory 60, or in persistent portion of memory 60, each form a computer program product. The processing circuitry 52 running one or more applications thus forms a specialized circuit constructed and arranged to carry out the various processes described herein.

FIG. 2 illustrates an example method 100 performed by a controller device. It should be understood that one or more of the steps or sub-steps of method 100 may be omitted in some embodiments. Similarly, in some embodiments, one or more steps or sub-steps may be combined together or performed in a different order. Dashed lines indicate that a step or sub-step is either optional or representative of alternate embodiments or use cases.

In step 110, controller device 36 connects to a plurality of robotic vehicles 32 over a wireless connection 34. In some embodiments, the connection is made over a mesh network (sub-step 111). In some embodiments, step 110 is accomplished by performing sub-step 114. In sub-step 114, a driver (e.g., communications driver 62) operates on the controller device 36 to communicate with the plurality of robotic vehicles 32 via a radio 50 of the controller device 36.

In step 120, controller device 36 selectively controls one of the plurality of robotic vehicles 32 (e.g., robotic vehicle 32(*a*)) over the wireless connection 34. In some embodiments (see sub-step 111 above), this communication is done indirectly through another robotic vehicle (e.g., robotic vehicle 32(*b*)) (sub-step 121).

Step 120 may include one or more of sub-steps 123-126. In sub-steps 123-126, user 37 operates user input circuitry 56 or other user input circuitry of the controller device 36 that is external to the tablet 70 to direct the operation of the selected robotic vehicle 32(*a*). In some embodiments, the controller device 36 may display one or more graphical control elements (not depicted) on a graphical user interface (GUI) on the display screen 54. These graphical control elements may include, for example, buttons, switches, sliders, and other similar elements capable of receiving touch commands.

In sub-step 123, control module 66 directs operation of a water spraying device 48 mounted on the selected robotic vehicle 32(*a*). This direction of operation may include sending one or more commands 86 instructing the water spraying device 48 to point in a particular direction, to turn on or off, or to operate at a particular flow rate. For example, user 37 may operate a joystick (not depicted) to change the orientation of the water spraying device 48 and press a button (either physical or graphical) to turn the water on and off or operate a slider to adjust the water intensity. Sub-step 122 is particularly useful when the robotic device 32(*a*) is a firefighting robot engaged in firefighting operations.

In sub-step 124, control module 66 directs operation of a drivetrain 47 of the selected robotic vehicle 32(*a*). This direction of operation may include sending one or more commands 86 instructing the robotic vehicle 32(*a*) to speed up, maintain velocity, slow down, or stop moving (e.g., by engaging a braking mechanism).

In sub-step 125, control module 66 directs steering operation of the selected robotic vehicle 32(*a*). This direction of steering operation may include sending one or more commands 86 instructing the robotic vehicle 32(*a*) to turn left, turn right, tilt up, tilt down, roll clockwise, roll counter-clockwise, or maintain current course. For example, user 37 may operate a joystick (not depicted) to change the orientation of the selected robotic vehicle 32(*a*) and press one or more buttons (either physical or graphical) to accelerate and decelerate or operate a slider to adjust the velocity. In some embodiments, steering operation may include directing particular steering elements (e.g., rudders, ailerons, etc.) to move. In some embodiments, steering operation may include sending drivetrain commands (see sub-step 124) differentially to different engines or wheels.

In sub-step 126, control module 66 directs operation of another device 44 of the selected robotic vehicle 32(*a*) by sending appropriate commands 86.

In some embodiments, step 120 further includes sub-step 128. In sub-step 128, user 37 may swap out a first battery 74(1) from battery port 72(1) in order to replace it with a replacement first battery 74(1) while the controller device 36 continues to control the selected robotic vehicle 32(*a*) due to tablet 70 continuing to be powered by a second battery 74(2) inserted in second battery port 72(2). Similarly, second battery 74(2) may be swapped out while first battery 74(1) continues to power tablet 70 from first battery port 72(1). It should be understood that although sub-step 128 is depicted as part of step 120, battery swapping as in sub-step 128 may also occur as part of any of the other steps of method 100.

In some embodiments, step 120 may be implemented by method 200 of FIG. 3.

In step 210, selection module 64 receives a list 80 of the robotic vehicles 32 available across network 34 via the radio 50. In some embodiments (not depicted), step 210 may include receiving a set of availability datagrams (e.g., using the UDP protocol) broadcast by the various robotic vehicles 32. Lach datagram identifies a particular robotic vehicle 32. Selection module 64 then aggregates the information from the various received datagrams into list 80.

In step 220, selection module 64 sends the list 80 to graphical display module 68, and graphical display module 68 displays the list 80 on the GUI of display screen 54. Then, in step 230, selection module 64 receives a selection 82 from user 37 via the user input circuitry 56 of a particular robotic vehicle 32(*a*) indicated on the list 80 to be controlled. In some embodiments, step 230 includes sub-step 235 in which the selection 82 is received by the user 37 touching a touch interface on display screen 54 operating as a touchscreen.

Then, in step 240, selection module 64 informs the control module 66 of the selection 82, and control module 66 performs a handshake procedure 84 with the selected robotic vehicle 32(*a*) over the wireless connection 34 to confirm that the controller device 36 is the only controller device 36 controlling the selected remote robotic vehicle 32(*a*). If the handshake procedure 84 is successful, then control module 66 continues on to perform control operations on the selected robotic vehicle 32(*a*) as depicted in step 120 of FIG. 2. Otherwise, the selection fails, and control module 66 does not control the selected robotic vehicle 32(*a*).

At some point, in step 250, selection module 64 may receive, via the radio 50, updates to the list 80 of the robotic vehicles 32 currently available across network 34. In some embodiments, each robotic vehicle 32 periodically (e.g., once every 10 seconds) sends out an availability datagram (see above in connection with step 210). If more than a predetermined amount of time (e.g., 10 or 20 seconds) elapses without receiving an availability datagram from a particular robotic vehicle 32, then selection module 64 may assume that that robotic vehicle 32 has moved out of range or been deactivated and, accordingly, remove that robotic vehicle 32 from the list 80. In addition, selection module 64 may also add a new robotic vehicle 32 to the list 80 if it receives a datagram from a new robotic vehicle 32 that was not already on the list 80. Then, in step 260, selection module 64 sends the updated list 80 to graphical display module 68, and graphical display module 68 displays the updated list 80 on the GUI of display screen 54, as in step 220. In some embodiments, step 260 is performed in response to the user 37 inputting a command (e.g., via a graphical control element of the GUI) to review the list 80.

Then, in step 270, selection module 64 may receive another selection 82 from user 37 via the user input circuitry 56 of another robotic vehicle 32(*b*) indicated on the list 80 to be controlled. In response, in step 280, control module 66 performs another handshake procedure 84 with the newly-selected robotic vehicle 32(*b*) over the wireless connection 34 to confirm that the controller device 36 is the only controller device 36 controlling the newly-selected remote robotic vehicle 32(*b*). If the new handshake procedure 84 is successful, then control module 66 continues on to perform control operations on newly-selected robotic vehicle 32(*b*) as depicted in step 120 of FIG. 2. Otherwise, the selection fails, and control module 66 does not control the newly-selected robotic vehicle 32(*b*). In some embodiments, upon successful performance of the new handshake procedure 84 of step 280, control module 66 terminates control of the previously-selected robotic vehicle 32(*a*), freeing that robotic vehicle 32(*a*) to be controlled by a different controller device 36. In other embodiments, controller device 36 is able to maintain control of more than one robotic vehicle 32 at a time.

Returning to method 100 of FIG. 2, in step 130, graphical display module 68 displays on the video screen 54 of the controller device 36, a video stream 88 received from the selected robotic vehicle 32(*a*). In some embodiments, only one such video stream 88 us received from the selected robotic vehicle 32(*a*), while in other embodiments, multiple video stream 88 may be received simultaneously from the selected robotic vehicle 32(*a*). In some of the latter embodiments, user 37 may select which video stream 88 to display, while in other of these embodiments, all of the received video streams 88 may be displayed at once, next to each other on display screen 54. In some embodiments, the graphical control elements of the GUI with which the user 37 is able to control the selected robotic vehicle 32(a) are overlaid over the video stream 88 that is displayed on the video screen 54.

In some embodiments (see sub-step 111 above), the receipt of the video stream 88 is done indirectly through another robotic vehicle (e.g., robotic vehicle 32(b)) (sub-step 131).

In some embodiments, in step 140, graphical display module 68 displays on the video screen 54 of the controller device 36, another video stream 88 received from another unselected robotic vehicle 32 (e.g., robotic vehicle 32(b)) while continuing to control the selected remote robotic vehicle 32(a) over the wireless connection 34. In some of these embodiments, user 37 may select which video stream 88 (i.e., the video stream 88 from the selected robotic vehicle 32(a) or the video stream 88 from an unselected robotic vehicle 32(b)) to display, while in other of these embodiments, all of the received video streams 88 may be displayed at once, next to each other on display screen 54.

FIG. 4 illustrates an example method 300 performed by a robotic vehicle 32, e.g., robotic vehicle 32(a).

In step 310, robotic vehicle 32(a) connects to other robotic vehicles 32 and to the controller device(s) 36 over the wireless network 34, for example, configured as a mesh network. In some embodiments (not depicted), step 310 may include providing a connection between a controller device 36 and another robotic vehicle 32(b) through the robotic vehicle 32(a) due to the controller device 36 being unable to communicate directly with the other robotic vehicle 32(b) (e.g., due to being out of radio range or having too weak of a signal). In some embodiments (not depicted), step 310 may include robotic vehicle 32(a) sending out a datagram identifying the robotic vehicle 32(a) and receiving datagrams from the other robotic vehicles 32 and controller devices 36. Step 310 may be performed by radio 38 and computer 40.

Then, in step 320, robotic vehicle 32(a) receives a request from a controller device 36 over the wireless network 34 (potentially through one or more other robotic devices in a mesh configuration) requesting to control the robotic vehicle 32(a). In response, robotic vehicle 32(a) performs a handshake operation 84 with the controller device 36 to confirm that that controller device 36 is the only controller device 36 currently controlling the robotic vehicle 32(a).

If the handshake operation 84 succeeds, then operation proceeds to step 340, in which the robotic vehicle 32(a) is controlled by the remote controller device 36 by computer 40 receiving commands 86 and causing those commands 86 to be fulfilled by the appropriate devices 44 of the robotic vehicle 32(a). In some embodiments, robotic vehicle 32(a) may be configured to perform sub-step 345, in which, if the signal from the remote controller device 36 is lost in the middle of performing an operation, then that operation is terminated as a safety measure, and control of the robotic vehicle 32(a) by the remote controller device 36 is terminated. In step 360, computer 40 sends a video stream 88 from one or more cameras 42 of the robotic vehicle 32(a) to the controller device 36.

If the handshake operation 84 fails, then operation proceeds to step 350, in which the robotic vehicle 32(a) refuses to grant control of the robotic vehicle 32(a) to the controller device 36. Thus, robotic vehicle 32(a) will not fulfill commands 86 received from the controller device 36. In some embodiments, even if the handshake operation 84 fails, robotic vehicle 32(a) may still send a video stream 88 from one or more cameras 42 of the robotic vehicle 32(a) to the controller device 36.

Thus, techniques have been presented for effectively monitoring and controlling robotic vehicles 32. These techniques include a controller device 36 simultaneously communicating with several remote robotic vehicles 32 over a wireless network 34 and allowing a user 37 to select a particular one (e.g., robotic vehicle 32(a)) of those remote robotic vehicles 32 to be controlled by the controller device 36. A high bandwidth channel is used, allowing control commands 86 and video 88 to be sent over the same channel. Flexible software is installed on the controller device 36 allowing control features to be easily upgraded through software. In addition, the controller device 36 may be configured as a small tablet 70 or similar computer embedded into a chassis having a radio 50 and two battery slots 72(1), 72(2), allowing one battery 74(1) to be removed while another battery 74(2) is swapped out during operation to provide high availability.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set" of is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature, or act. Rather, the "first" item may be the only one. In addition, an identification herein of a particular element, feature, or act as being a "first" such element, feature, or act and another particular element, feature, or act as being a "second" such element, feature, or act should be construed as requiring that the "first" and "second" elements, features, or acts are different from each other, unless specified otherwise. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, it should be understood that all embodiments which have been described may be combined in all possible combinations with each other, except to the extent that such combinations have been explicitly excluded.

Furthermore, Applicant makes no admission that any technique, method, apparatus, or other concept presented in this document is prior art under 35 U.S.C. § 102 or 35 U.S.C. § 103, such determination being a legal determination that depends upon many factors, not all of which are known to Applicant at this time.

What is claimed is:

1. A method performed by a controller device, the method comprising:
connecting to a plurality of remote robotic vehicles over a wireless connection;
selectively controlling one of the plurality of remote robotic vehicles over the wireless connection; and
displaying, on a video screen of the controller device, a video stream received from the one remote robotic vehicle over the wireless connection,
wherein connecting to the plurality of remote robotic vehicles is performed via a wireless mesh network made up of the plurality of remote robotic vehicles;
wherein selectively controlling includes communicating with the one remote robotic vehicle via at least one other one of the remote robotic vehicles over the wireless mesh network; and
wherein the video stream is received by the controller device from the one remote robotic vehicle via the at least one other one of the remote robotic vehicles over the wireless mesh network.

2. The method of claim 1 wherein the method further comprises, after displaying the video stream received from the one remote robotic vehicle, further displaying, on the video screen of the controller device, another video stream received from another one of the plurality of remote robotic vehicles over the wireless connection while continuing to control the one remote robotic vehicle over the wireless connection.

3. The method of claim 1 wherein the method further comprises swapping out a first battery of the controller device for a replacement of the first battery while the controller device continues to control the one remote robotic vehicle over the wireless connection powered by a second battery of the controller device.

4. The method of claim 1 wherein connecting to the plurality of remote robotic vehicles includes operating a driver of the controller device to communicate with the plurality of remote robotic vehicles via a radio of the controller device.

5. The method of claim 1 wherein selectively controlling includes:
receiving a list of the plurality of remote robotic vehicles via the wireless connection;
displaying the received list on a graphical user interface (GUI) of the video screen of the controller device;
receiving a selection of the one remote robotic vehicle from a user via the GUI; and
performing a handshake procedure with the one remote robotic vehicle over the wireless connection to confirm that the controller device is the only controller device controlling the one remote robotic vehicle.

6. The method of claim 5 wherein receiving the selection of the one remote robotic vehicle from the user via the GUI includes receiving the selection via the user touching a touch interface of the video screen.

7. The method of claim 6 wherein selectively controlling the one remote robotic vehicle further includes displaying graphical control elements for controlling the one remote robotic vehicle on the GUI overlaid over the video stream displayed on the video screen.

8. The method of claim 5 wherein the method further comprises:
receiving another selection of another one of the plurality of remote robotic vehicles from the user via the GUI; and
performing another handshake procedure with the other one of the remote robotic vehicles over the wireless connection to confirm that the controller device is the only controller device controlling the other one of the remote robotic vehicles.

9. The method of claim 1 wherein, when displaying the video stream received from the one remote robotic vehicle, the method further includes displaying at least one additional video stream received from the one robotic vehicle over the mesh network, such that multiple video streams from the one robotic vehicle are displayed.

10. The method of claim 1, wherein said one of the plurality of robotic vehicles is a tracked firefighting vehicle, and wherein selectively controlling said one of the plurality of devices includes include controlling, via the mesh network, a direction or flow rate or a direction and flowrate of water ejected from the firefighting vehicle.

11. An apparatus comprising:
a radio configured to connect to a plurality of remote robotic vehicles over a wireless connection;
a video screen; and
processing circuitry coupled to memory configured to:
selectively control one of the plurality of remote robotic vehicles over the wireless connection; and
display, on the video screen, a video stream received from the one remote robotic vehicle over the wireless connection,
wherein the radio connects to the plurality of remote robotic vehicles via a wireless mesh network made up of the plurality of remote robotic vehicles;
wherein selectively controlling includes communicating with the one remote robotic vehicle via at least one other one of the remote robotic vehicles over the wireless mesh network; and
wherein the video stream is received by the radio from the one remote robotic vehicle via the at least one other one of the remote robotic vehicles over the wireless mesh network.

12. The apparatus of claim 11 wherein the processing circuitry coupled to memory is further configured to, after displaying the video stream received from the one remote robotic vehicle, further display, on the video screen, another video stream received from another one of the plurality of remote robotic vehicles over the wireless connection while continuing to control the one remote robotic vehicle over the wireless connection.

13. The apparatus of claim 11,
wherein the apparatus further comprises:
a tablet computer comprising the video screen and the processing circuitry coupled to memory, the radio being external to the tablet;
power management circuitry;
a first battery port; and
a second battery port; and
wherein the power management circuitry is configured to selectively route power from the first battery port and the second battery port to the tablet computer, the processing circuitry coupled to memory configured to continue controlling the one remote robotic vehicle over the wireless connection powered by a battery inserted in one of the first battery port and the second battery port.

14. The apparatus of claim 13 wherein a driver operating on the tablet is configured to communicate with the plurality of remote robotic vehicles via the radio.

15. The apparatus of claim 14 wherein the driver operating on the tablet is further configured to:

receive a list of the plurality of remote robotic vehicles from the radio;

cause the received list to be displayed on a graphical user interface (GUI) of the video screen;

receive a selection of the one remote robotic vehicle from a user via the GUI; and perform a handshake procedure with the one remote robotic vehicle over the wireless connection via the radio to confirm that the apparatus is the only device controlling the one remote robotic vehicle.

16. The apparatus of claim 15, wherein the video screen is a touchscreen; and wherein the driver is configured to receive the selection of the one remote robotic vehicle from the user via the GUI by receiving a touch command from the user touching the touchscreen.

17. The apparatus of claim 15 wherein the driver operating on the tablet is further configured to:

receive another selection of another one of the plurality of remote robotic vehicle from the user via the GUI; and perform another handshake procedure with the other one of the remote robotic vehicles over the wireless connection via the radio to confirm that the apparatus is the only device controlling the other one of the remote robotic vehicles.

18. A method performed by a robotic vehicle of a plurality of robotic vehicles, the method comprising:

connecting to the plurality of remote robotic vehicles and to a remote controller device over a wireless mesh network;

receiving a request from the remote controller device over the wireless mesh network requesting to control the robotic vehicle;

in response to receiving the request, performing a handshake with the remote controller device to confirm that the remote controller device is the only controller device controlling the robotic vehicle;

performing operations in response to receiving control commands from the remote controller device; and sending a live video stream to the remote controller device over the wireless mesh network.

19. The method of claim 18 wherein the method further comprises:

receiving a request from another remote controller device over the wireless mesh network requesting to control the robotic vehicle; and in response to receiving the request, refusing to grant control to the other remote controller device.

20. The method of claim 18 wherein the method further comprises sending the live video stream to another remote controller device over the wireless mesh network while continuing to be controlled by the remote controller device and not being controlled by the other remote controller device.

* * * * *